United States Patent Office 3,076,029
Patented Jan. 29, 1963

3,076,029
MANDELIC ACID HYDRAZIDES AS AMINE OXIDOSE INHIBITORS
Claire H. Yates, Verdun, Quebec, and Lloyd M. Thompson, Pointe Claire, Quebec, Canada, assignors to Charles E. Frosst & Co., Montreal, Quebec, Canada, a corporation of the Province of Quebec
No Drawing. Filed May 22, 1961, Ser. No. 111,458
Claims priority, application Great Britain May 23, 1961
1 Claim. (Cl. 260—559)

The present invention relates to novel hydrazide derivatives.

The products of the present invention are $N^1$—substituted hydrazides which may be represented by the following general formula:

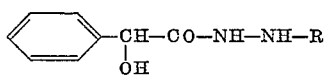

I wherein R stands for ethyl or isopropyl radicals.

The products of the present invention are prepared by reducing under appropriate conditions hydrazones of the general formula:

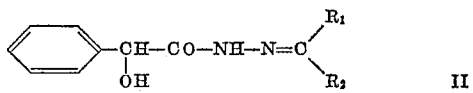

II wherein $R_1$ stands for hydrogen or methyl and $R_2$ stands for methyl, whereby the —N=C grouping becomes saturated. As an example of conditions whereby such a reduction may be effected satisfactorily there may be mentioned the use of hydrogen in the presence of a metal catalyst, or of some effective reducing agents as the metal hydrides, for example, sodium or potassium borohydride, lithium aluminum hydrazide, and the like. The starting materials of the Formula II have been found to be most conveniently prepared by allowing the hydrazide derivative of mandelic acid, i.e. mandelhydrazide, to react with the appropriate aldehyde or ketone. In carrying out this reaction, an inert solvent, for example, alcohol, may be included particularly in the case of the higher boiling aldehyde or ketones or of the very volatile aldehydes. In cases where the reaction proceeds to slowly for practical effectiveness, the rate may be increased by including acetic acid or other agents of the same nature as a catalytic agent.

The $N^1$—substituted hydrazide derivatives of the present invention may be converted to the acid addition salts by contacting the organic bases with an acid which will form a non-toxic acid addition salt, for example hydrochloric acid. In many instances, the formation of such salts imparts greatly increased water solubility to these substances.

The antiphlogistic activity of the benzilhydrazides of the present invention was determined by the method described by Sentnikar et al. (Br. J. Pharmacol., 1959, 14,484). In this method, formaldehyde is injected into the plantar-aponeurosis of rats in order to induce oedema. Compounds to be tested are injected subcutaneously immediately prior to injection and the subsequent appearance or non-appearance of oedema noted over a 6-hour period. In the present case β-phenylisopropyl hydrazine hydrochloride was used as the control compound.

The lack of monoamine oxidase inhibition was made by the reserpine antagonism test. In this test 5 mice are injected with reserpine at a dose level of 5 mg./kg. Three hours after injection, activity is measured over a 30-minute period after which the compounds of the present invention were injected intraperitoneally and activity measured for a further 30 minutes. Differences between activity before and after injection of the compounds of the present invention were noted.

The $LD_{50}$ of the compounds of the invention was also determined and reported in Table 1 along with the results of the reserpine antagonism test and antiphlogistic test.

TABLE I

| Compound | $LD_{50}$, mg./kg. | Reserpine Antagonism | Dose, i.p., mg./kg. | Antiphlogistic activity | Dose, mg./kg. |
|---|---|---|---|---|---|
| β-phenylisopropyl hydrazine | 140 | 56 | 40 | ++++ | 100 |
| Isopropylmandel hydrazide | 830 | 10 | 415 | + | 100 |
| Ethylmandel hydrazide | 500 | 1 | 250 | + | 100 |

The following examples are given to illustrate the preparation of the products of the present invention:

*Example I*

12 g. of mandelhydrazide, M.P. 135–136° C., was refluxed for 1 hours with 50 ml. of acetone. The resulting suspension was cooled and the solid 1-isopropylidene-mandelhydrazide collected and washed with cold acetone. The product, 13.5 g., melted at 138–139° C. Then 5 gm. of the above material was dissolved in 50 ml. of hot alcohol and allowed to cool to ambient temperature. To this solution was added 0.95 g. of solid sodium borohydride and the mixture permitted to stand for ca. 18 hours. The excess sodium borohydride was decomposed by rendering the mixture slightly acidic using 10% acetic acid. The solvent was removed by vacuum distillation, a small volume of water was added and the precipitated product collected, washed neutral with water and dried. The 1-isopropylmandelhydrazide, 3.7 g., M.P. 151–152° C. was purified further by one recrystallization from ethyl acetate.

*Example II*

To a warm solution of 12 g. of mandelhydrazide in 120 ml. of alcohol was added 16.3 ml. of acetaldehyde. After a reflux period of 2 hours, the volume was reduced to one-third whereupon the product separated. The 1-ethylidene mandelhydrazide was collected and washed with ethanol: wt. 13.49 g., M.P. 142–144° C.

8 g. of 1-ethylidene mandelhydrazide dissolved in 100 ml. of alcohol was reduced with 1.57 g. of sodium borohydride and the product isolated as described in Example I. Recrystallization from diethyl ether and ethyl acetate yielded 1-ethylmandelhydrazide of M.P. 118.5–119° C.

We claim:
A compound of the formula:

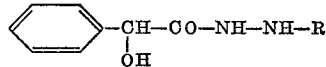

wherein R is ethyl.

References Cited in the file of this patent
UNITED STATES PATENTS 2,928,875    Martin et al. _____ Mar. 15, 1960

OTHER REFERENCES

Beilstein's Handbuch der Organischen Chemie, vol. X, page 209 (1927).
Offe et al.: Z. Naturforsch, vol. 7–b, pages 446–462, pages 446–53 relied on (1952), (C/559S).
Yale et al.: Journ. Am. Chem. Soc., vol. 75, pages 1933–42, pages 1933, 1935, 1936, 1940, 1941 relied on (1953) (C/559S).